United States Patent [19]

Engelke et al.

[11] 4,445,652
[45] May 1, 1984

[54] ADJUSTABLE ROCKET THRUST ALIGNMENT DEVICE

[75] Inventors: Claude W. Engelke; Royal A. Power; Dale W. Brees, all of Wichita, Kans.

[73] Assignee: The Boeing Company, Seattle, Wash.

[21] Appl. No.: 361,849

[22] Filed: Mar. 25, 1982

[51] Int. Cl.³ .......................... B64D 47/00; B64F 5/00
[52] U.S. Cl. ........................................ 244/1 R; 73/65; 244/54; 244/55
[58] Field of Search .................... 244/58, 1 R, 54, 55, 244/63, 56, 52, 129.1; 73/65

[56] References Cited

U.S. PATENT DOCUMENTS

| | | | |
|---|---|---|---|
| 2,391,243 | 12/1945 | Hutton | 73/65 |
| 2,946,285 | 7/1960 | Nauschutz | 244/63 |
| 3,174,330 | 3/1965 | Boundy | 73/65 |
| 3,278,138 | 10/1966 | Haberkorn | 244/52 |
| 3,349,566 | 10/1967 | Tyrrell et al. | 244/58 |
| 3,897,030 | 7/1975 | Cors et al. | 244/63 |

Primary Examiner—Galen L. Barefoot
Attorney, Agent, or Firm—Edwin H. Crabtree

[57] ABSTRACT

An alignment device for adjusting the takeoff assist thrust vector of a rocket booster in a desired relationship to the center of gravity of an autonomous missile. The device provides for using "plumb bob type" hanging tool prior to installing the rocket booster on the missile.

5 Claims, 3 Drawing Figures

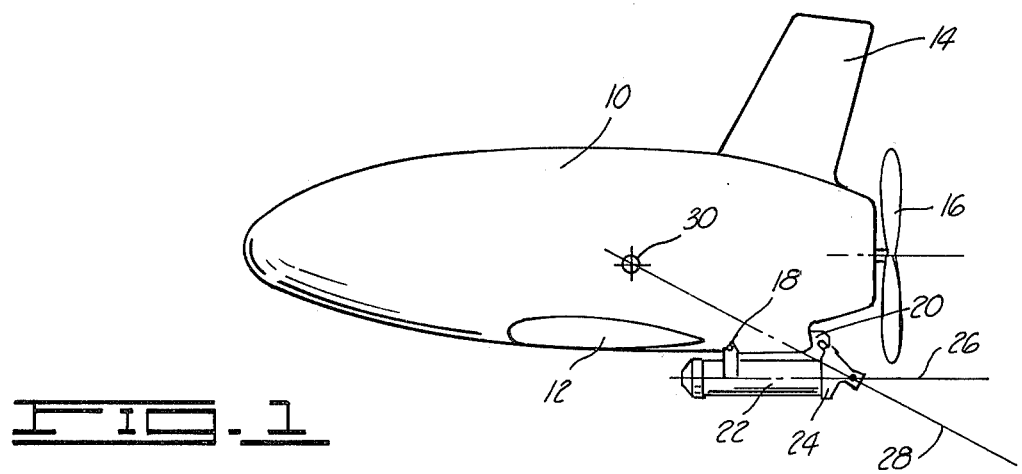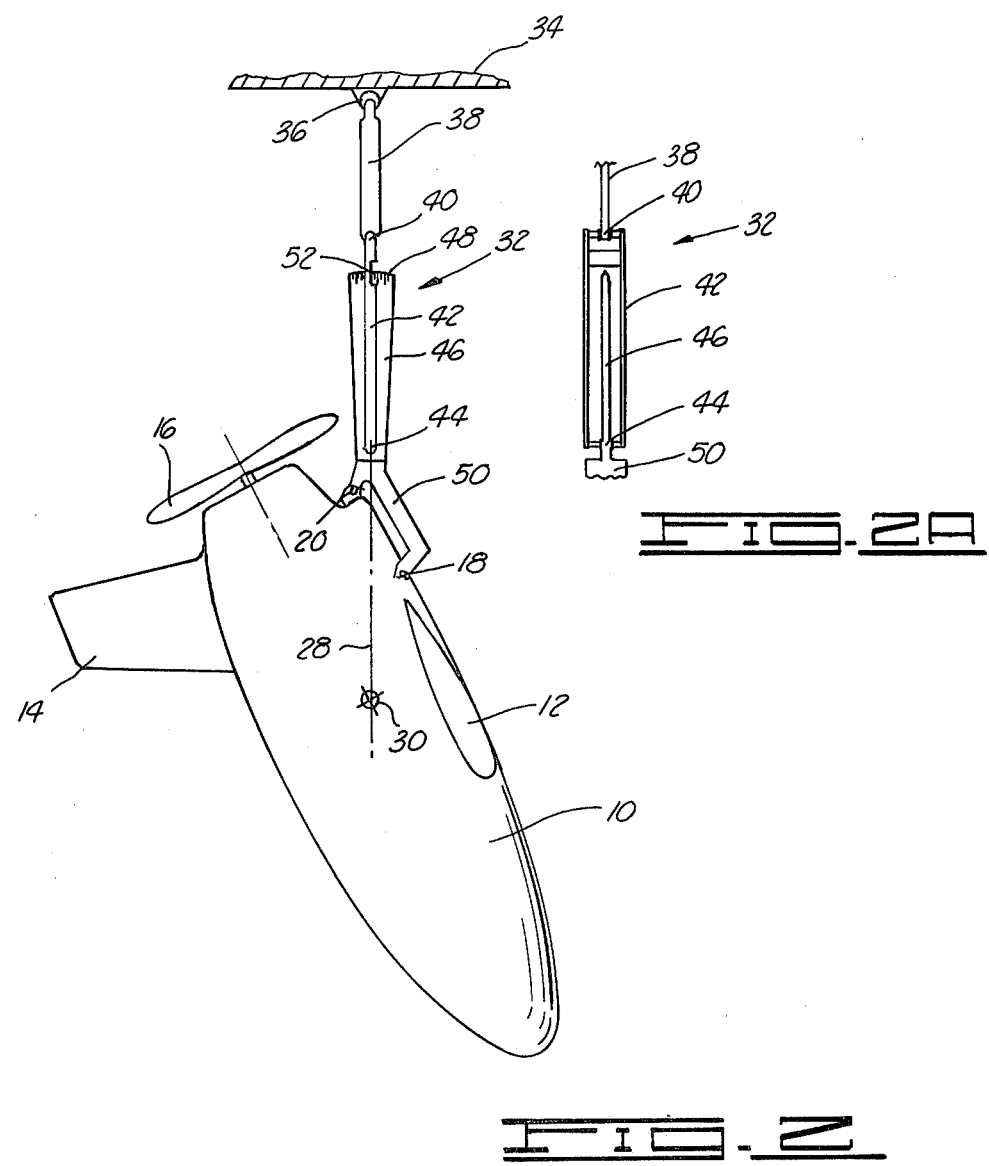

ADJUSTABLE ROCKET THRUST ALIGNMENT DEVICE

BACKGROUND OF THE INVENTION

This invention relates to adjusting the thrust vector alignment of an autonomous missile or the like and more particularly but not by way of limitation to an alignment device for adjusting the thrust vector of a rocket booster attached to the missile.

Heretofore, the development of small light weight drones and remotely piloted autonomous missiles with ground zero launch capabilities have been restricted because of instability during the initial launch phase. During this phase the vehicle has not achieved sufficient air speed for the control surfaces to be effective in counteracting moments induced by the misalignment of the takeoff assist thrust vector and the missile's center of gravity.

Known vehicles in this class solve the problem by air launch, ground rail launch or by design to produce relative large inherit pitching and yawing moments of interia in the vehicle. Close control of manufacturing tolerances will also assure the takeoff assist thrust vector alignment is within a required range with respect to the missile's center of gravity.

Air and ground rail launch severely restrict deployment and launch capabilities. Design for large pitching and yawing moments of interia result in long, slender vehicles which increase weight do not lend themselves to payload versatility. Controlling the takeoff assist thrust vector alignment with respect to the missile's center of gravity by close manufacturing tolerances and processes is costly and does not lend itself to high production.

The subject alignment device for adjusting the takeoff assist thrust vector of a rocket booster with respect to the center of gravity of the autonomous missile solves the above mentioned problems and provides the advantages as described herein.

SUMMARY OF THE INVENTION

The subject invention provides a simple device for establishing the takeoff assist thrust vector accurately relative to the center of gravity of an autonomous missile or the like.

The takeoff assist rocket booster is external and does not effect the usable volume or aerodynamics of the missile's body. By attaching the rocket booster below the missile a pusher propeller can be used for driving the aircraft with no problem in ejecting the rocket booster.

The alignment device for adjusting the takeoff assist thrust vector of a rocket booster relative to the center of gravity of an autonomous missile or the like includes an adjustable aft support and a front support attached to the missile and adapted for receiving the rocket booster thereon. A hanging tool is attached to the rear support and the front support for suspending the missile therefrom. By adjusting the rear support the takeoff assist vector of the booster is adjusted relative to the center of gravity of the missile.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a side view of the autonomous missile with a rocket booster attached to a front and rear support.

FIG. 2 illustrates the missile suspended from a hanging tool attached to the front and rear support.

FIG. 2A is a front view of a portion of the hanging tool.

DETAILED DESCRIPTION OF THE DRAWINGS

In FIG. 1 an autonomous missile 10 is shown having wings 12, a tail 14 and a propeller drive 16. Mounted at the rear and the bottom of the missile 10 is a hinged front support 18 and an adjustable rear support 20. The rear support 20 is adjustable up and down in a vertical plane. Attached to the front support 18 and the rear support 20 is a rocket booster 22 having a canted nozzle 24. The center line of the rocket 22 is illustrated by a line 26 with the takeoff assist thrust vector represented by line 28. It should be noted that in this Figure the takeoff assist thrust vector 28 is properly aligned through the center of gravity 30 of the missile 10. The alignment of the takeoff assist thrust vector 28 relative to the center of gravity 30 of the missile 10 is achieved by a hanging tool 32 illustrated in FIGS. 2 and 2A.

In FIG. 2 the missile 10 can be seen suspended from a hanging support 34 which includes a hanging gimbal 36 attached to a link 38. The link 38 is attached to an upper gimbal 40. The upper gimbal 40 is secured to an indication yoke 42. The indication yoke 42 is attached by a lower gimbal 44 to a pointer assembly 46 having a scale 48 on the upper end. The pointer assembly 46 includes a lower portion 50 which is releasably attached to the front support 18 and the rear support 20.

The hanging tool 32 provides a "plumb bob" type of arrangement with the pointer assembly 46 ballasted to produce a moment about the lower gimbal 44 equal to that of the actual takeoff assist rocket booster 22 so the effective center of gravity 30 of the missile 10 while hanging on the tool 32 will be the same as the missile 10 with the booster rocket 32 attached thereto.

When balanced, a zero mark 52 on the scale 48 represents the takeoff assist thrust vector 28 which is aligned with the center of gravity 30. The indicator yoke 42 always points to the missile's center of gravity 30. When the missile 10 is suspended on the hanging tool 32 the rear support 20 is adjusted so the pointer assembly 46 will read on the zero mark 52 to achieve the desired relationship between the takeoff assist thrust vector 28 and the missile's center of gravity 30.

The unique alignment device which includes the front support 18, rear support 20 and the hanging tool 32 provides means of alignment essentially eliminating variation due to manufacturing tolerances and processes and reduces the missile' alignment due to variations which occur within the takeoff assist rocket booster 22 due to nozzle erosion and burn variations. After takeoff the booster 22 is automatically ejected after expending its propellant.

Changes may be made in the construction and arrangement of the parts or elements of the embodiments as described herein without departing from the spirit or scope of the invention defined in the following claims.

What is claimed is:

1. An alignment device for adjusting the takeoff assist thrust vector of a rocket booster in a desired relationship to the center of gravity of an autonomous missile or the like, the device comprising:

an adjustable rear support attached to the missile;

a front support attached to the missile, the front and rear support adapted for receiving the rocket booster thereon; and a hanging tool attached to the rear support and the front support for suspending the missile therefrom, by adjusting the rear support, the takeoff assist thrust vector of the booster is adjusted relative to the center of gravity of the missile.

2. The device as described in claim 1 wherein the hanging tool includes a pointer assembly adapted for attachment to the rear support and the front support, the pointer assembly gimbaled to a hanging support.

3. The device as described in claim 2 wherein the pointer assembly is ballasted to produce a moment equal to that of the actual takeoff assist thrust booster rocket so the effective center of gravity of the missile, while hanging on the hanging tool, will be the same as the missile with the booster rocket mounted thereon.

4. The device as described in claim 3 wherein the pointer assembly includes a zero mark which represents the takeoff assist thrust vector with the indicator yoke pointing to the missile's center of gravity.

5. An alignment device for adjusting the takeoff assist thrust vector of a rocket booster in a desired relationship to the center of gravity of an autonomous missile or the like, the device comprising:

an adjustable rear support attached to the missile;

a front support attached to the missile, the front and rear support adapted for receiving the booster rocket thereon;

a hanging tool having a pointer assembly attached to the front and rear support, the pointer assembly ballasted to produce a moment about an indication yoke equal to that of the actual takeoff assist rocket booster so the effective center of gravity while hanging on the tool will be the same as the missile booster rocket when mounted thereon, the indication yoke attached to a link, the link gimbaled to a hanging support for suspending the hanging tool therefrom.

* * * * *